Oct. 13, 1942.  B. ULINSKI  2,298,544
STEERING JOINT
Filed June 1, 1940
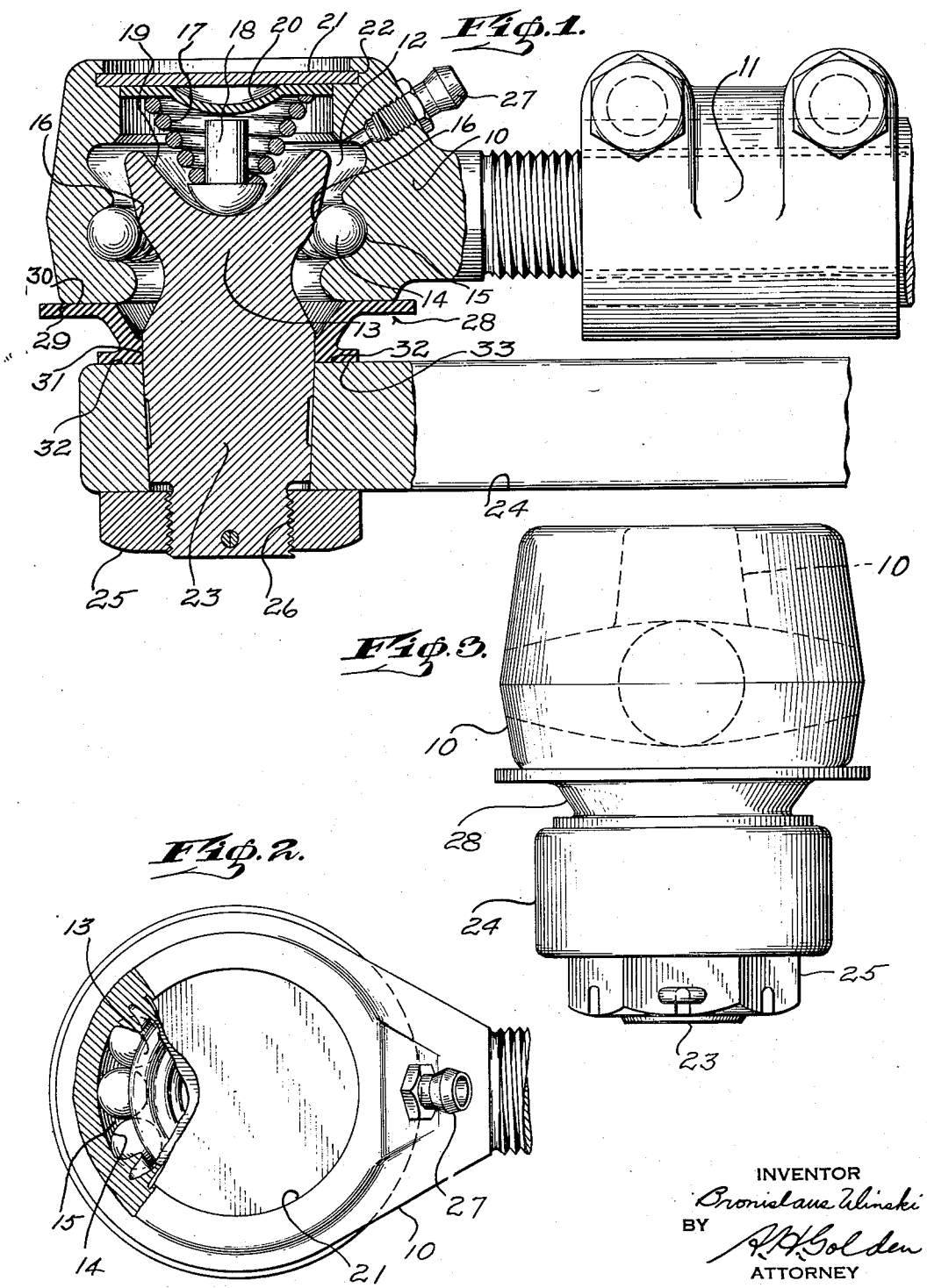
INVENTOR
Bronislaus Ulinski
BY
R. H. Golden
ATTORNEY Patented Oct. 13, 1942

2,298,544

UNITED STATES PATENT OFFICE 2,298,544

STEERING JOINT

Bronislaus Ulinski, Chicago, Ill., assignor to The Yale & Towne Manufacturing Company, Stamford, Conn., a corporation of Connecticut Application June 1, 1940, Serial No. 338,329

1 Claim. (Cl. 287—90)

This invention relates to a steering joint, and particularly to a joint to be used in the steering apparatus of an industrial truck.

More particularly, my invention comprises an improvement over that type of steering joint in which a case encloses a steering ball so that movement imparted to the case through suitable linkage is transmitted through the ball to the steering wheels.

As a feature of my invention, steering movement is imparted from the case to the ball through a series of ball bearings suitably mounted for transmitting the force required. My invention contemplates further the arrangement of the surfaces with which said ball bearings cooperate so that wear in the joint is automatically compensated. As an additional feature of my invention, I utilize novel means for sealing my joint effectively against the entry of dirt, while preferably allowing the escape of grease from the joint, when new grease is being inserted therein under pressure.

I have thus described generally several of the features of my invention in order that the operation thereof may be better understood. It will be appreciated, however, that there are other and additional features of my invention which will appear clear after a reading of the specification which follows. Moreover, while I shall show and describe a particular detailed form which my invention takes, it will be appreciated by those skilled in the art that the basic concept of my invention may be utilized in other forms by those skilled in the art.

For a description of my invention, I shall refer to the drawing wherein Fig. 1 is a partial section through the case and ball forming my new and novel steering joint. Fig. 2 is a view looking downwardly on the case of Fig. 1 with certain of the parts thereof broken away. Fig. 3 is an end view of the structure of Fig. 1 looking endwise at Fig. 1 from the left towards the right.

Referring now more particularly to the drawing, reference numeral 10 indicates what I call a case, or ball case, and which is adapted to have transmitted thereto steering motion through linkage mechanism connected to the case as through a coupling 11 in a manner which is well understood by those skilled in the art.

The case 10 has formed therein a transverse opening 12 within which is mounted what I term a ball 13, to which motion is transmitted from the case 10 through the intermediary of a series of ball bearings 14 mounted between a surface 15 formed on the case and a cooperating surface 16 formed on the ball. The surface 15, which is defined by what may be termed spaced flanges, maintains the ball bearings 14 against vertical displacement, so that the said ball bearings are always in correct alignment with the ball 13, and with only the ball 13 being capable of vertical movement, as will appear quite clearly hereinafter. The ball is held downwardly against the ball bearings 14 by a spring 17 through the intermediary of a headed pin 18 cooperating with the upper cuplike surface 19 of the ball 13.

The end of the spring 17 opposite that end which bears against the pin 18, rests against a hardened steel spring seat 20 which is retained in place by an expansion plug 21 forced into an undercut seat 22 of the case.

The ball 13 is equipped with a downwardly extending steering portion 23 lying outside of the case 10 and secured relatively to a steering rod 24 through the intermediary of a nut 25 which is threaded as at 26 on to the end of the steering portion 23. Grease is inserted within the opening 12 of the case through a nipple 27 of a type well known in the art, and is retained within the case through the utilization of a gasket 28, which is of a molded type preferably formed from a resilient material known by the trade-mark "Neoprene." This gasket not only acts to maintain the grease within the opening 12, but also effectively seals the inside of the case against the entry of dirt. Thus, the flange portion 29 of the gasket 28 fits closely against the surface 30 of the case, while the surface 31 of the gasket fits closely about the downwardly extending steering portion 23 of the ball. Preferably, also, the surface 32 of the gasket lies against the upper surface 33 of the steering link 24.

With the parts in this relationship, it will be further understood that the admission of grease into the case opening 12 through the nipple 27 will force the old grease out between the various sealing surfaces of the gasket 28 and the parts of the joint, whereby to rid the ball case of any foreign materials which may have entered therein.

Having now described the construction of my invention, it will be helpful to explain the assembly of the parts thereof and their manner of cooperation. In assembling the structure, the ball bearings 14 are first inserted into the opening 12 of the case 10 against their cooperating surface 15. The steering ball 13 is then dropped vertically so that its surface 16 lies against the ball bearings 14. The spring 17 and its cooper- ating pin 18 are then inserted, and the spring seat 20 applied. The expansion plug 21 is then properly located relatively to the upper end of the opening 12 of the case and through the application of suitable pressure, as is understood in the art, is forced into its seat 22. The "Neoprene" gasket 28 is of course applied between the steering link 24 and the case 10, as is quite readily appreciated.

It will now be noted that when steering movement is applied through the case 10 to the ball bearings 14, in the plane of the said ball bearings, there will be a tendency, due to the relationship of the ball surface 16 to the several ball bearings 14, to lift the ball vertically and against the pressure of spring 17. This tendency to lift the ball 13 is of course resisted by the spring 17, it being apparent that the contour of the ball surface 16 is so determined that that component of the force exerted through the ball bearings 14 which tends to lift the ball 13, is relatively small. The greater component of the force is transmitted so as to move the ball with the case through the intermediary of the ball bearings, while allowing the ball to rotate as required. Naturally, as already outlined, the ball bearings 14 will always remain in their position shown in the case so as to effect a better functioning thereof.

Because of the slight upwardly tapering contour of surface 16 of the ball 13, it will be appreciated, however, that any wear in the ball, the ball bearings 14, or the surface 15 of the case against which the ball bearings rest, will be fully compensated. Thus, the ball 13 will move downwardly under the pressure of the spring 17 so that its surface 16 will take up any wear which will occur, all as will be appreciated by those skilled in the art.

I now claim:

In a combination of the class described, a case having an internal opening, a steering ball in said opening, a circular ball bearing supporting and guiding surface formed as part of the surface of said internal opening of said case and comprising spaced upper and lower flanges, a ball bearing cooperating surface formed on said ball, a series of ball bearings lying between said surfaces and held against vertical movement by said upper and lower flanges whereby force is transmitted from said case to said ball through said ball bearings, said surface on said ball being formed with a slight taper extending vertically when the ball bearings are in a horizontal plane, whereby lateral thrust of said case through said ball bearings against said ball surface will have but very slight tendency to move said ball vertically, the said spaced flanges of said supporting and guiding surface holding said ball bearings against displacement, and a spring in said case pressing said ball against said ball bearings, said ball moving vertically under the pressure of said spring whereby automatically to compensate for wear between said ball and case and said ball bearings.

BRONISLAUS ULINSKI.